(12) United States Patent
Paquet et al.

(10) Patent No.: US 12,233,568 B2
(45) Date of Patent: Feb. 25, 2025

(54) WOOD OPTIMIZATION SYSTEM, METHOD OF OPTIMIZING WOOD PRODUCTS AND WOOD PRODUCT SELECTOR THEREFORE

(71) Applicant: TIMBER TECHNOLOGY INC., Lévis (CA)

(72) Inventors: Marc-Antoine Paquet, Lévis (CA); Wassim Louati, Lévis (CA); Carl Poirier, Lévis (CA)

(73) Assignee: TIMBER TECHNOLOGY INC., Lévis (CA)

( * ) Notice: Subject to any disclaimer, the term of this patent is extended or adjusted under 35 U.S.C. 154(b) by 530 days.

(21) Appl. No.: 17/517,809

(22) Filed: Nov. 3, 2021

(65) Prior Publication Data

US 2022/0258376 A1 Aug. 18, 2022

(30) Foreign Application Priority Data

Feb. 12, 2021 (CA) .................................. CA 3109134

(51) Int. Cl.
| | |
|---|---|
| *B27B 31/06* | (2006.01) |
| *G01B 11/02* | (2006.01) |
| *G01B 11/25* | (2006.01) |
| *G05B 19/042* | (2006.01) |
| *G06T 1/00* | (2006.01) |

(Continued)

(52) U.S. Cl.
CPC ............ *B27B 31/06* (2013.01); *G01B 11/022* (2013.01); *G01B 11/25* (2013.01); *G06T 1/0014* (2013.01); *G06T 7/0004* (2013.01)

(58) Field of Classification Search
CPC ......... B27B 31/06; G06T 1/0014; G06T 7/00; G01B 11/022; G01B 11/25; G06V 20/52; G06V 2201/06; G05B 2219/39391; G05B 2219/45229; G05B 19/0426
See application file for complete search history.

(56) References Cited

U.S. PATENT DOCUMENTS

| | | | |
|---|---|---|---|
| 2019/0098261 A1* | 3/2019 | Voyer | ........................ G06T 7/73 |
| 2020/0016723 A1* | 1/2020 | Roy | ...................... G06T 7/0004 |
| 2023/0024974 A1* | 1/2023 | Rendahl | ............... G06V 10/147 |

OTHER PUBLICATIONS

Canadian Patent Office—Examination Report mailed Apr. 3, 2024, from CA Patent Application No. 3,109,134, 3 pages.

* cited by examiner

*Primary Examiner* — Mohammed S. Alawadi
(74) *Attorney, Agent, or Firm* — SCHWABE, WILLIAMSON & WYATT, P.C.

(57) ABSTRACT

There is described a wood optimization system for a production line. The wood optimization system generally having a conveyor moving wood products across a handling area; a wood product selector positioned proximate to a selected wood product in the handling area; and a computer vision system along the production line having a camera imaging the handling area, a processor communicatively coupled to the camera, and a computer-readable memory having program code that when executed by the processor perform the steps of: receiving from the camera an image representing at least a portion of the handling area; finding the wood product selector in the image; identifying the selected wood product in the image as the wood product of the plurality being most proximate to the wood product selector; receiving an instruction associated to the selected (Continued)

wood product; and implementing the instruction into optimization data associated to the selected wood product.

22 Claims, 8 Drawing Sheets

(51) Int. Cl.
*G06T 7/00* (2017.01)
*G06V 20/52* (2022.01)

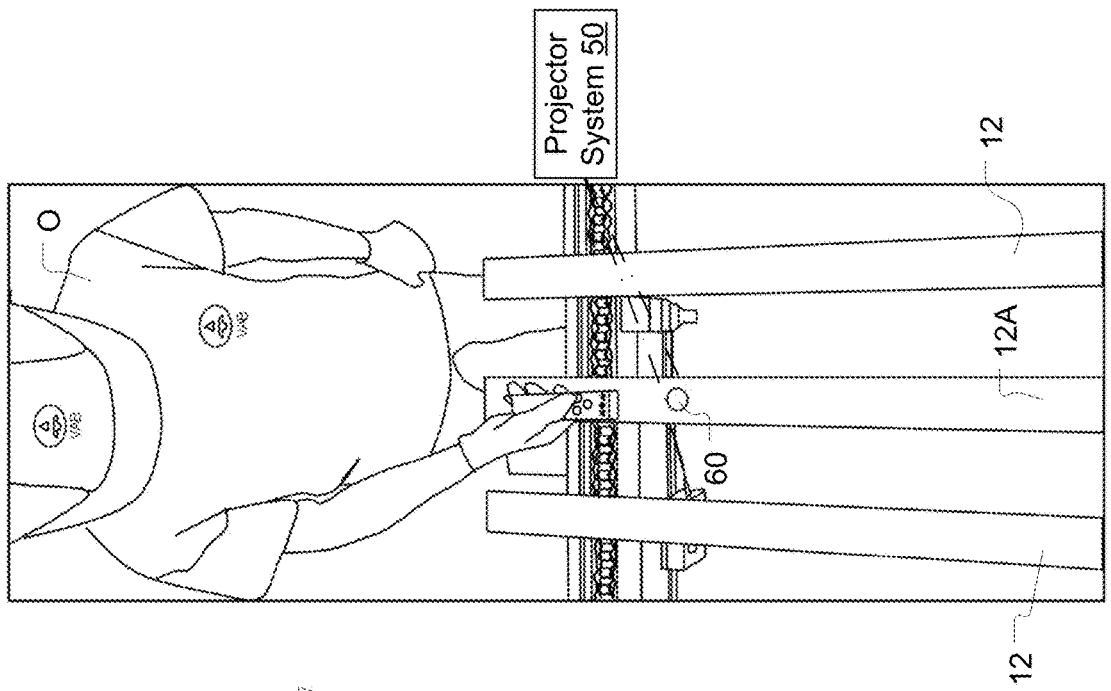
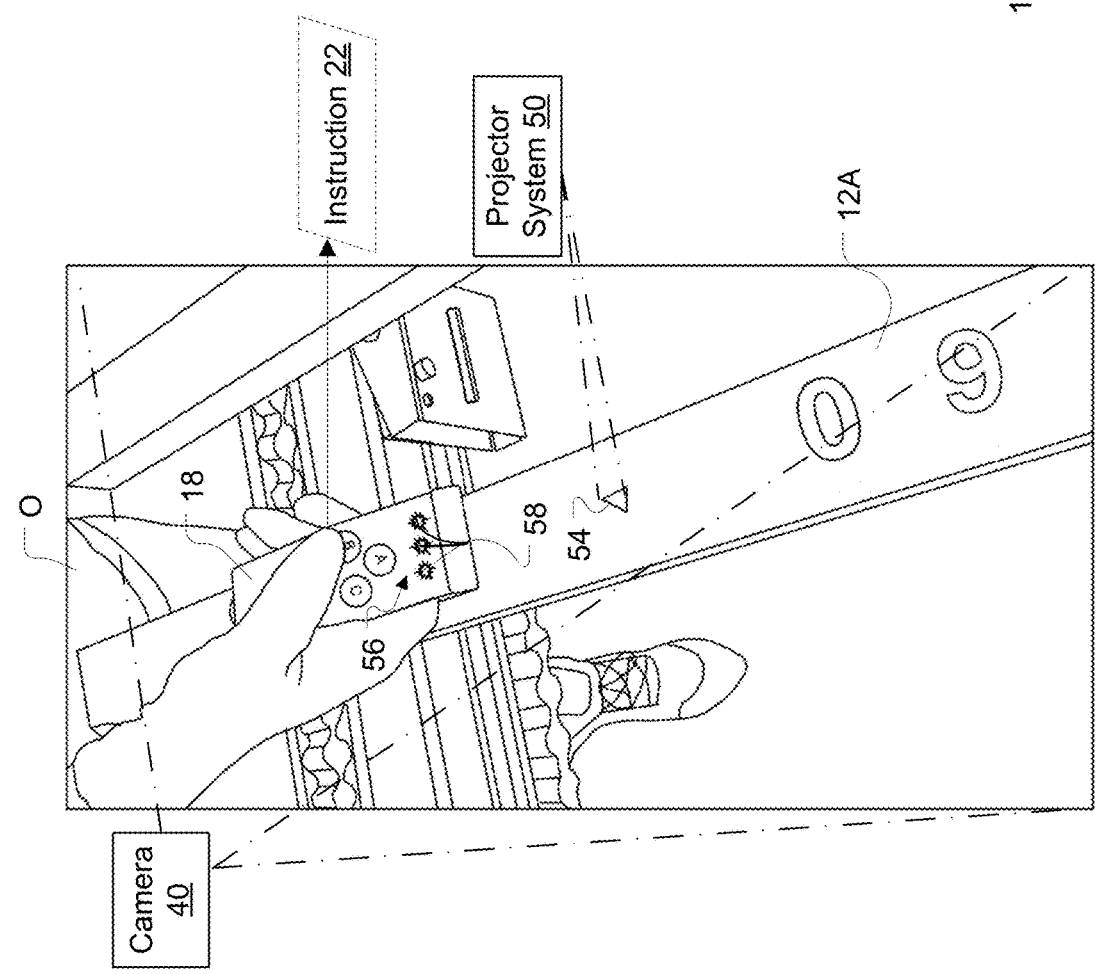

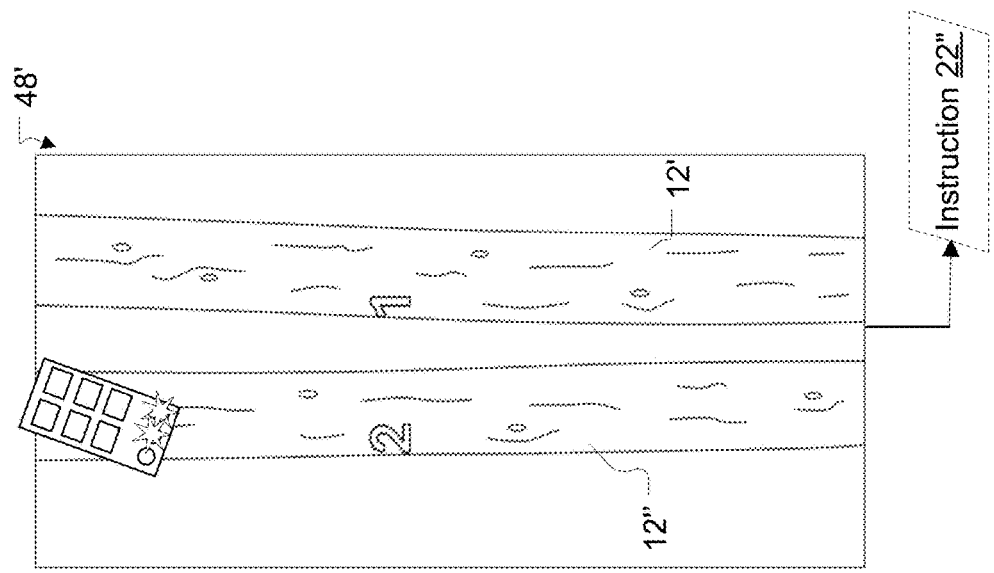
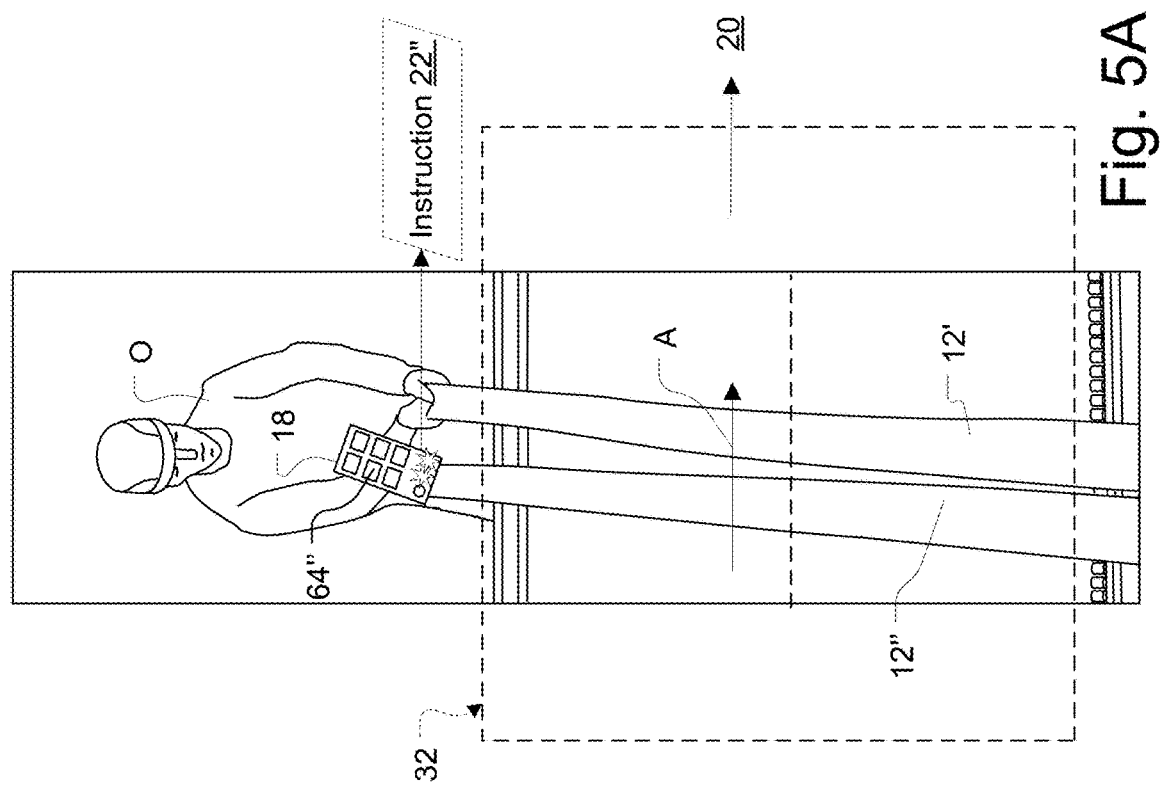
Fig. 5B
Fig. 5A

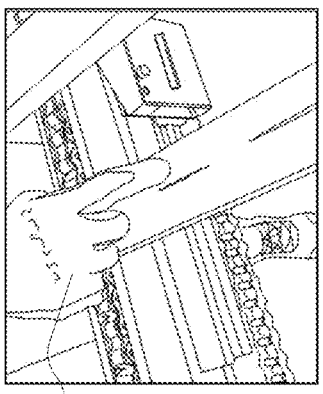 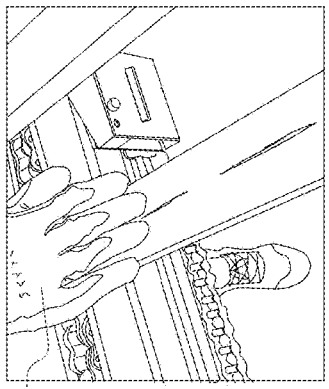 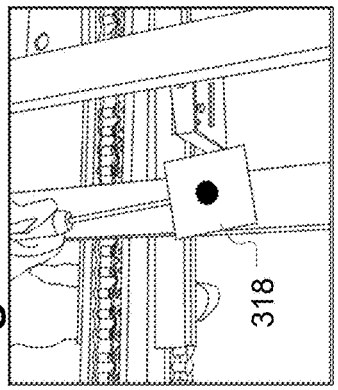
Fig. 8A  Fig. 8B  Fig. 8C
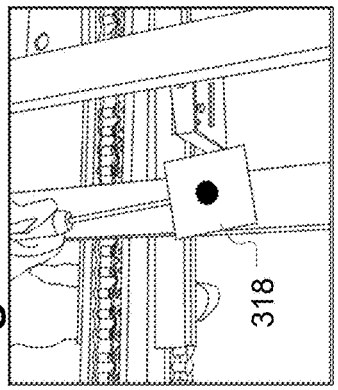 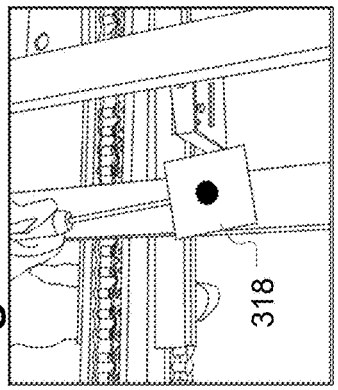 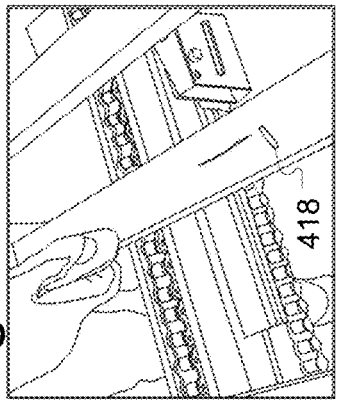
Fig. 9A  Fig. 9B  Fig. 9C
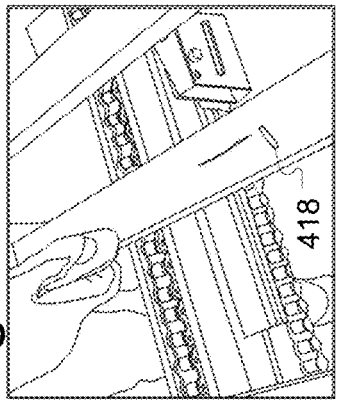 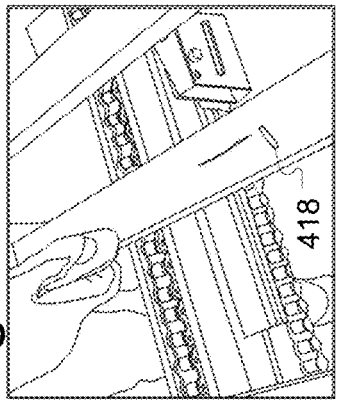 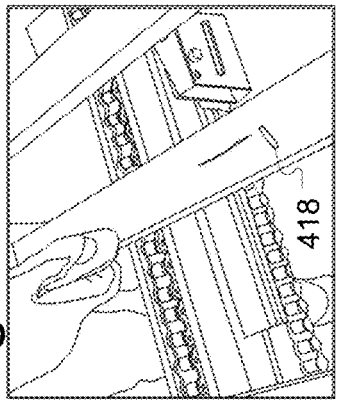
Fig. 10A  Fig. 10B  Fig. 10C

WOOD OPTIMIZATION SYSTEM, METHOD OF OPTIMIZING WOOD PRODUCTS AND WOOD PRODUCT SELECTOR THEREFORE

FIELD

The improvements generally relate to a wood product production line and more particularly relate to a wood optimization system optimizing wood products based on corresponding optimization data.

BACKGROUND

In the wood product industry, prices can vary on a daily basis. Accordingly, it is of importance for a wood product producer to optimize its production based on the current prices. More specifically, the pricing of the wood product can vary depending of its dimensions (e.g., length) and grade. Although greater length of wood products is typically associated with greater pricing, the presence of a defect along a length of the wood product can negatively affect the grade of the product as a whole. Accordingly, in some instances, it is preferable to trim the defect off in a manner to obtain a shorter wood product of a greater grade, for instance.

Considering that, in a typical production line, the wood products are moved at a speed that can range between 366 m/min (1200 ft./min) and 610 m/min (2000 ft./min), these decisions have to be taken in an automated manner. Accordingly, in some production lines, one or more conveyors move, for instance, wood products from a wood product optimizer to a wood product trimmer (simply referred to as "the optimizer" and "the trimmer"). The optimizer generally scan successive ones of the wood products, to decide whether or not and how to trim each wood product based on the current prices and to generate optimization data including trimming instructions and/or grading instructions. In some embodiments, the trimmer can later use the trimming instructions to trim the wood product. To ensure that any given wood product is trimmed and graded according to its own optimization data, the typical production line generally includes a wood tracker. The wood tracker has a computer vision system imaging the wood products and tracking them in real time as they are moved and manipulated in the handling area, and a light projector displaying information concerning each wood product on a surface thereof. As such, when an operator disagrees with a trimming or grading instruction projected on a given one of the wood products, she/he may mark a new trimming or grading instruction directly on a top surface of the wood product. That marking is then read by the computer vision system on the go which can in turn update the optimization data associated to that wood product according to the new instruction(s).

Although existing wood optimization systems were satisfactory to a certain degree, there always remains room for improvement, especially in avoiding such wood product markings.

SUMMARY

It was found that there is need in the industry for a wood optimization system which does not necessitate markings to be made on the wood product as they are moved across the handling area. As such, there is described a wood optimization system involving the use of a wood product selector which when imaged by the computer vision system can identify which one of the wood products has been selected for a new trimming or grading instruction. As such, upon receiving a new trimming or grading instruction associated to the selected wood product, which may either be apparent from the imaged wood product selector or wirelessly communicated to the computer vision system by the selected wood product, the wood optimization system can implement the new instruction into optimization data associated to the selected wood product for subsequent optimization.

In accordance with a first aspect of the present disclosure, there is provided a wood optimization system for a production line, the wood optimization system comprising: a conveyor configured for moving a plurality of wood products across a handling area; a wood product selector positioned proximate to a selected wood product of the plurality of wood products in the handling area; and a computer vision system along the production line having a camera imaging the handling area, a processor communicatively coupled to the camera, and a computer-readable memory having program code that when executed by the processor perform the steps of: receiving from the camera an image representing at least a portion of the handling area; finding the wood product selector in the image; identifying the selected wood product in the image as the wood product of the plurality being most proximate to the wood product selector; receiving an instruction associated to the selected wood product; and implementing the instruction into optimization data associated to the selected wood product.

In accordance with a second aspect of the present disclosure, there is provided a method of optimizing wood products in a production line, the method comprising: positioning a wood product selector proximate to a selected wood product of a plurality of wood products being handled across a handling area; using a camera, generating an image of the handling area representing at least the wood product selector and at least a proximate one of the wood products; and using a computer, finding the wood product selector in the image; identifying the selected wood product in the image as the wood product of the plurality being most proximate to the wood product selector; receiving an instruction associated to the selected wood product; and implementing the instruction into optimization data associated to the selected wood product.

In accordance with a third aspect of the present disclosure, there is provided a wood product selector for use with a wood optimization system, the wood product selector comprising: a housing having at least a surface; a plurality of input sources mounted to said surface; a computing device communicatively coupled to the input sources, the computing device receiving an input from one of the input sources and, in response, generating a signal indicative of a desired instruction corresponding to the activated input source, said desired instruction being implementable into optimization data pertaining to a wood product being most proximate to the housing while said one of the input sources is activated.

Many further features and combinations thereof concerning the present improvements will appear to those skilled in the art following a reading of the instant disclosure.

DESCRIPTION OF THE FIGURES

In the figures,

FIG. 3A is an oblique view of a portion of a handling area at a first moment in time as with the wood product selector is manipulated to indicate a new instruction for a given wood product, in accordance with one or more embodiments;

FIG. 3B is an image of a portion of the handling area of FIG. 3A at a subsequent moment in time, with the new instruction being projected onto the given wood product, in accordance with one or more embodiments;

FIG. 5A is an oblique view of a portion of the handling area with the wood product selector in close proximity with a second wood product, in accordance with one or more embodiments;

FIG. 5B is an image of the handling area of FIG. 5A showing the wood product selector overlapping a portion of the second wood product, in accordance with one or more embodiments;

FIGS. 8A to 8C are images representing a glove acting as a wood product selector and forming different patterns indicative of new instructions for the wood product overlapped thereby, in accordance with one or more embodiments;

FIGS. 9A to 9C are images representing a multifaceted object acting as a wood product selector and forming different patterns indicative of new instructions for the wood product overlapped thereby, in accordance with one or more embodiments; and FIGS. 10A to 10O are images representing a laser pointer spot acting as a wood product selector and forming different patterns indicative of new instructions for the wood product overlapped thereby, in accordance with one or more embodiments.

DETAILED DESCRIPTION

Figure 1:
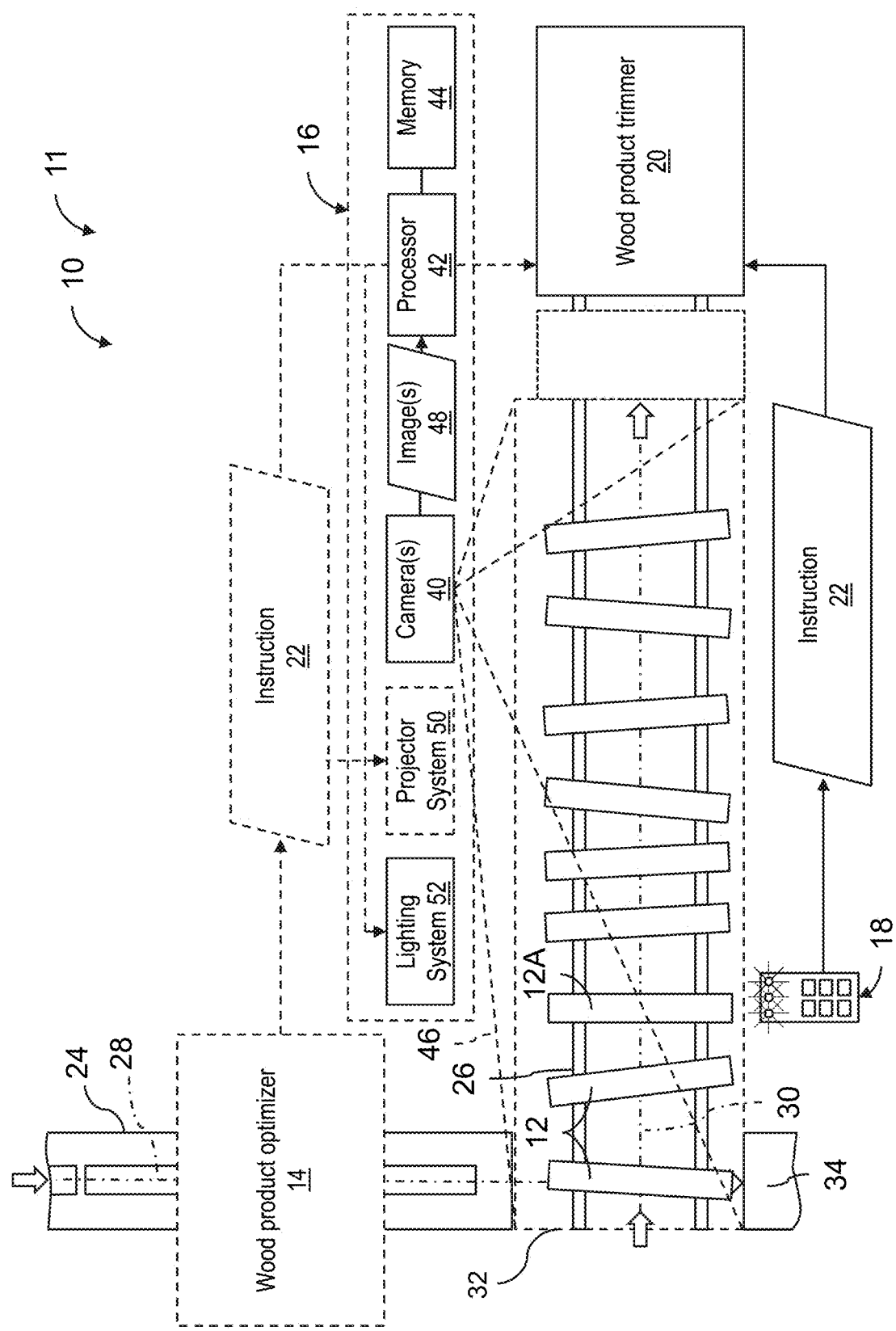
FIG. 1 is a schematic view of an example of a wood optimization system for optimizing wood products, in accordance with one or more embodiments.

FIG. 1 shows an example of a wood optimization system 10 of a production line 11 for elongated wood products 12 such as lumbers, logs and the like (simply referred to as "wood products 12").

As depicted in this example, the wood optimization system 10 includes an optimizer 14, a computer vision system 16, a wood product selector 18 and a trimmer 20. An optional wood product loader 17 may be provided upstream from the trimmer 20 and proximate thereto to load each wood product 12 into the trimmer 20. In embodiments where an operator operates the wood product selector 18 to associate respective trimming and/or grading instructions 22 to each wood product 12 on an individual basis, the optimizer 14 can be omitted.

In this example, the movement of the wood products 12 is allowed by two separate conveyors, one being a longitudinal conveyor 24 and the other being a transverse conveyor 26. It is understood that in other embodiments, the number, type and arrangement of conveyor(s) may differ.

For instance, the longitudinal conveyor 24 is used to move the wood products 12 along a longitudinal path 28 and across an optimization area proximate to the optimizer 14. The transverse conveyor 26 is used to move the wood products 12 from an end of the longitudinal path 28, along a transverse path 30 at a transverse speed, across a handling area 32 of the production line 11 and towards a downstream cutting area proximate to the trimmer 20. Handling of the wood products 12 for manual and visual inspection may be limited to the handling area 32, where an operator may use the wood product selector 18 to modify trimming and/or grading instructions for a particular wood product as generated by the optimizer 14, as will be described below.

Since longitudinal speeds involved in such a production line 11 are relatively fast (e.g., between 366 m/min and 610 m/min), a stopper 34 can be provided proximate to a distal end of the longitudinal path 28 to stop each wood product 12 as they are "thrown" by the longitudinal conveyor 24 towards the stopper 34.

The optimizer 14 is configured to scan successive ones of the wood products 12 and to generate an instruction 22 for each wood product 12. The instruction 22 can include a trimming instruction, a grading instruction, or a combination thereof. In this example, the instructions 22 are sequentially transmitted to the trimmer 20 in a particular order such that a queue of optimization data arrives at the trimmer 20 during use. The instructions 22 which can be part of optimization data can include identification data indicating an order number of a given wood product in the queue, a type of the given wood product, a grade of the given wood product, a price, etc.

It is thus understood that any reordering of the wood products 12 between the optimizer 14 and the trimmer 20 may lead to a wood product being trimmed using the trimming instruction of another wood product and cause inefficiencies in the production line 11. For instance, some wood products may be reordered from their given order following unexpected bouncing onto the stopper 34. Some other wood products may be reordered by handling of the wood products in the handling area 32. Other reasons for reordering may also apply.

To address potential reordering of the wood product 12, the computer vision system 16 of the wood optimization system 10 can be used to track each wood product 12 in the handling area 32 such that any reordering of the wood product 12 causes reordering of the optimization data in order for the trimmer 20 to trim each wood product 12 with its corresponding trimming instruction 22, for instance.

More specifically, the computer vision system 16 has a camera 40, a processor 42 in communication with the optimizer 14 and with the trimmer 20 and a computer-readable memory 44.

As shown, the camera 40 has a field of view 46 substantially corresponding to the handling area 32. The handling area 32 can extend from the distal end of the longitudinal path 28 of the longitudinal conveyor 24 to an end of the transverse path 30 of the transverse conveyor 26.

The camera 40 is configured to generate one or more images 48 representing the handling area 32 at each successive moments in time during use of the wood optimization system 10. In this embodiment, the camera 40 has a frame rate of at least 20 fps and has a resolution of at least 1 megapixel. The frame rate of the camera 40, as well as its shutter speed, can be controlled by the processor 42, for instance. It is noted that depending on the application, the camera 40 can be configured to generate 2D images and/or 3D images. As it will be understood, in an alternate embodiment, the camera 40 includes more than one camera unit such that the field of view 46 is composite (i.e., the field of view results from the combination of more than one field of view of corresponding camera units). For ease of reading, however, the term "camera" is used in its singular form.

As shown in FIG. 1, the processor 42 is connected to the optimizer 14, to the camera 40 and to the trimmer 20 in a wired and/or wireless fashion. In this embodiment, the processor 42 is configured to receive the instruction 22 from the optimizer 14 or from the wood product selector 18, to acquire the images 48 from the camera 40 and to transmit the instruction 22 to the trimmer 20 in an order corresponding to the actual order the wood products 12 arriving to the trimmer 20. The processor 42 can include one or more processors but the term "processor" is used in its singular form for ease of reading. In an alternate embodiment, the processor 42 is remote from the production line 11.

In the example shown in FIG. 1, the processor 42 is in communication with the memory 44. The processor 42 and the memory 44 can be part of a computer (e.g., a personal computer, mobile device, etc.). In this embodiment, the memory 44 has stored thereon a wood tracking program, which, when ran by the processor 42, allows the computer vision system 16 to track the optimization data, e.g., the trimming and/or grading instruction(s) 22, of each wood product 12 across a plurality of images 48 representing the handling area 32 such that, when a given wood product 12 arrives at the trimmer 20, the processor 42 can transmit corresponding the instruction 22 for proper cutting and/or grading.

The computer vision system 16 also has a projector system 50 in this embodiment. The projector system 50 is in communication with the optimizer 14 and/or the processor 42 so as to receive relevant optimization data such as the trimming and/or grading instructions 22 associated to the wood products 12 and to project the optimization data onto a surface of each wood product for an operator in the handling area 32 to see. A lighting system 52 may be provided to ensure proper lighting conditions for both the image acquisition and information projection.

The wood product selector 18 is manipulated by the operator in the handling area 32 to define a new instruction 22 or otherwise supersede an initial instruction 22 generated by the optimizer 14, associated with one or more of the wood products 12 being moved across the handling area 32. For instance, the operator may recognize that the optimizer 14 made a mistake in the optimization, and associated instruction generation, and wish to modify the pending instruction 22 on the go.

Figure 2:
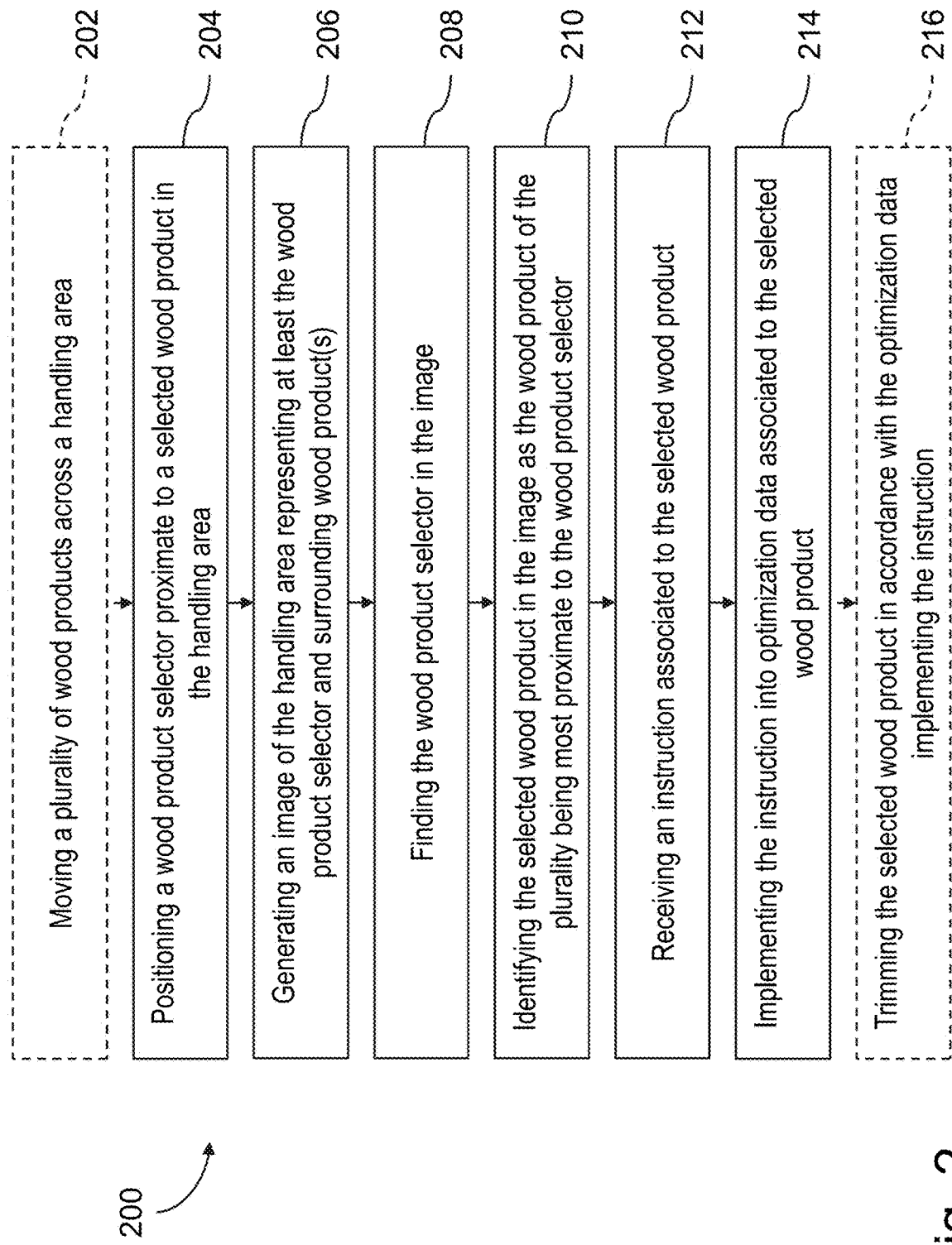
FIG. 2 is a flow chart of an example of a method for optimizing the wood products of FIG. 1, in accordance with one or more embodiments.

FIG. 2 shows a flow chart of an example method 200 of optimizing wood products using a wood optimization system. Reference to the wood optimization system 10 of FIG. 1 is made for ease of reading.

At step 202, the wood products 12 are moved across the handling area 32. In this example, the handling area 32 partially or wholly encompass the transverse conveyor 26 so that each wood product 12 is moved transversally in front of an operator that may watch the wood products 12, and corresponding instructions 22 as projected thereon by the projector system 50. In some embodiments, the wood product selector 18 has input sources which when activated can wirelessly send instructions to the production line 11 to increase or decrease the transversal speed at which the wood products 12 are moved along the transverse orientation 30.

At step 204, the wood product selector 18 is positioned proximate to a selected wood product 12A in the handling area 32. In some embodiments, the wood product selector 18 is movable as it is an item of a relatively small footprint and which can be easily manipulated by an operator. As will be discussed below, the wood product selector 18 can be provided in the form of a controller, a glove, a multifaceted object, a laser pointer spot, and the like. Step 204 is generally initiated when the operator notices that a given instruction 22, as projected onto a given wood product 12, needs modification. As such, the operator moves the wood product selector 18 in close vicinity of the given wood product 12 in order to "select" the given wood product 12, which may be recognized by the computer vision system 16, as described below. As the given wood product 12A is selected, the wood product selector 18 can be operated to generate a new instruction 22 by performing an action such as pressing a button, for instance.

At step 206, an image 48 of the handling area 32 is generated. The generated image 48 generally represents at least the wood product selector 18 and surrounding ones of the wood products 12. The image 48 can be generated by the camera(s) 40 of the computer vision system 16. The image 48 can then be stored on a memory of the computer vision system 16, or otherwise communicated to an external network or remote data repository for later consultation. In some embodiments, images 48 of the handling area 32 are generated at a given frequency in a continuous manner when the production line 11 is in operation.

At step 208, the wood product selector 18 is found in the image 48. The processor 42 may execute a object recognition module stored on the memory 44. Any suitable form, shape and/or pattern recognition techniques may be used to find the wood product selector 18 in the image 48. For instance, a reference model of the wood product selector 18 may be stored on the memory 44 for comparison or finding purposes. In these embodiments, pixel coordinates corresponding to a contour or a center of the wood product selector 18 in the image 48 may be generated and stored on the accessible memory 44.

At step 210, the selected wood product 12A is identified in the image 48 as the wood product 12 being most proximate to the wood product selector 18. In some embodiments, the wood product 12A deemed to be most proximate to the wood product selector 18 may be the wood product which has a greater portion of the wood product selector 18 overlapped thereby in the image 48. For instance, if 40% of the pixels associated to the wood product selector 18 in the image 48 overlap with a first wood product, and that 25% of the pixels associated to the wood product selector 18 in the image 48 overlap with a second wood product, then first wood product may be deemed to be the most proximate to the wood product selector 18. In cases where the wood product selector 18 does not overlap with any of the surrounding wood products 12 in the image 48, the computer vision system 16 may calculate a distance such as a pixel distance, e.g., the Euclidian distance, between the contour and/or center of the wood product selector 18 and the contour and/or center of any of the surrounding wood products 12 as shown in the image 48. In these embodiments, the wood product 12 having the smallest pixel distance relative to the wood product selector 18 may be identified as the one being most proximate, selected wood product 12A.

At step 212, an instruction 22 associated to the selected wood product 12A is received. The instruction 22 can be a trimming instruction, a grading instruction, or a combination thereof. The way in which the instruction 22 associated to the selected wood product 12A is received can differ from one embodiment to another. For instance, in some embodiments, the wood product selector 18 can be shaped to form a shape which is recognizable by the computer vision system 16 in the image 48. In these embodiments, the shape which can be formed by wood product selector 18 can be indicative of the corresponding instruction 22. For instance, if the wood product selector is a glove, it can be shaped to form different hand signs. In some embodiments, the wood product selector 18 emits a signal which is indicative of the corresponding instruction 22. The signal that is emitted may be an electromagnetic signal such as a radio signal transmitted by an emitter of the wood product selector 18 to a receiver of the computer vision system 16. In these embodiments, the signal may carry information indicative of the corresponding instruction 22. In some embodiments, the wood product selector 18 emits an illumination pattern indicative of the corresponding instruction 22. In these embodiments, the illumination pattern may be recognized in the image 48 by the computer vision system 16. Examples of illumination patterns can be spectrally encoded, spatially encoded, temporally encoded (in embodiments where the analyzed image includes a series of successive images), or a combination thereof.

At step 214, the instruction 22 is implemented into optimization data associated to the selected wood product 12A. Regardless of how the instruction 22 is received, it is thereby registered or otherwise implemented into already existing, or non-existent, optimization data that are to be processed by the trimmer to trim or grade each wood product. The instruction 22 can be implemented in a local manner, or a remote manner, depending on the embodiment.

At step 216, the selected wood product 12A is trimmed in accordance with the optimization data implementing the instruction 22. In this way, a given wood product may be trimmed using the right instruction regardless of if the optimizer 14 made a mistake in the generation of the initial instruction 22, as long as that mistake was caught by the operator, and appropriately corrected using the wood product selector 18 as the wood products are moved across the handling area 32.

FIGS. 3A and 3B show a given wood product 12A being handled in a handling area. As best shown in FIG. 3A, the projector system projects a triangle 54 on an exposed surface of the given wood product 12A, the triangle 54 being indicative of a first instruction. The first instructions may have been initially generated by an optimizer upstream from the handling area. As the operator O notices that the first instruction for that particular wood product 12A may be erroneous, the operator O decides to modify it for a new, second instruction. To do so, the operator O brings the wood product selector 18 in close proximity to the given wood product 12A, and activates an input source indicative of the second instruction 22 different than the first instructions. As the wood product selector 18 and surrounding wood products are imaged by an overlying camera 40, the computer vision system may detect that a modification is to be performed by noticing an illumination pattern 56 generated by the wood product selector 18 in the image. The computer vision system then determines which one of the surrounding wood products is closer to the wood product selector 18 in the image, identifies the selected wood product 12A in the image, and implements a new instruction 22 which may have been received. The new instruction 22 may be received via a wireless communication signal such as a radio-frequency signal or received via the information carried by the illumination pattern 56 generated by the wood product selector 18 and imaged by the camera 40. In this case, the three light indicators 58 light simultaneously which may be a code indicative of the new instruction to be implemented to the optimization data associated to that wood product in particular. Once the optimization data have been satisfactorily updated, the projector system 50 may project a circle 60, which may be indicative of the new instruction, onto the exposed surface of the wood product 12A, such as shown in FIG. 3B.

Figure 4B:
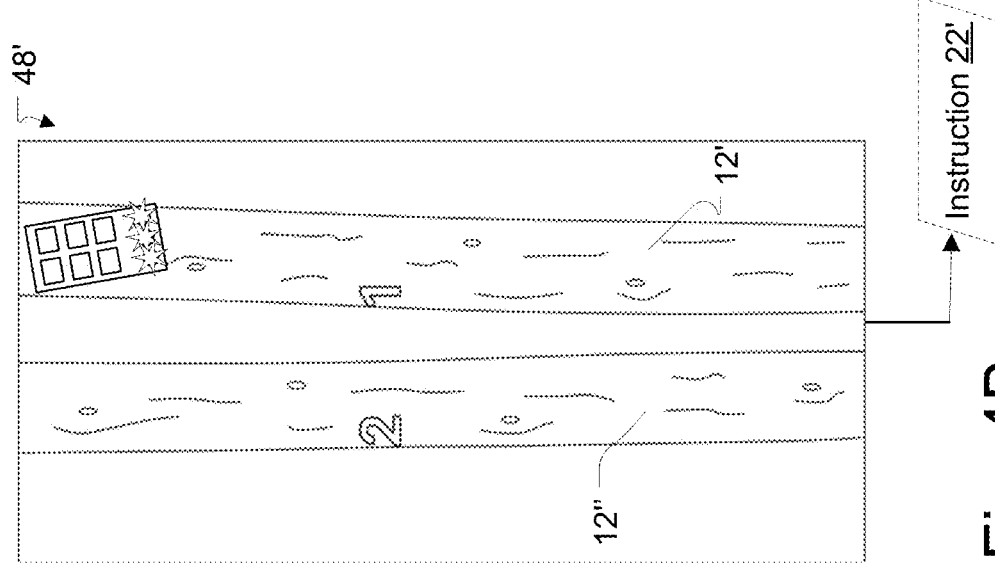
FIG. 4B is an image of the handling area of FIG. 4A showing the wood product selector overlapping a portion of the first wood product, in accordance with one or more embodiments.
Figure 4A:
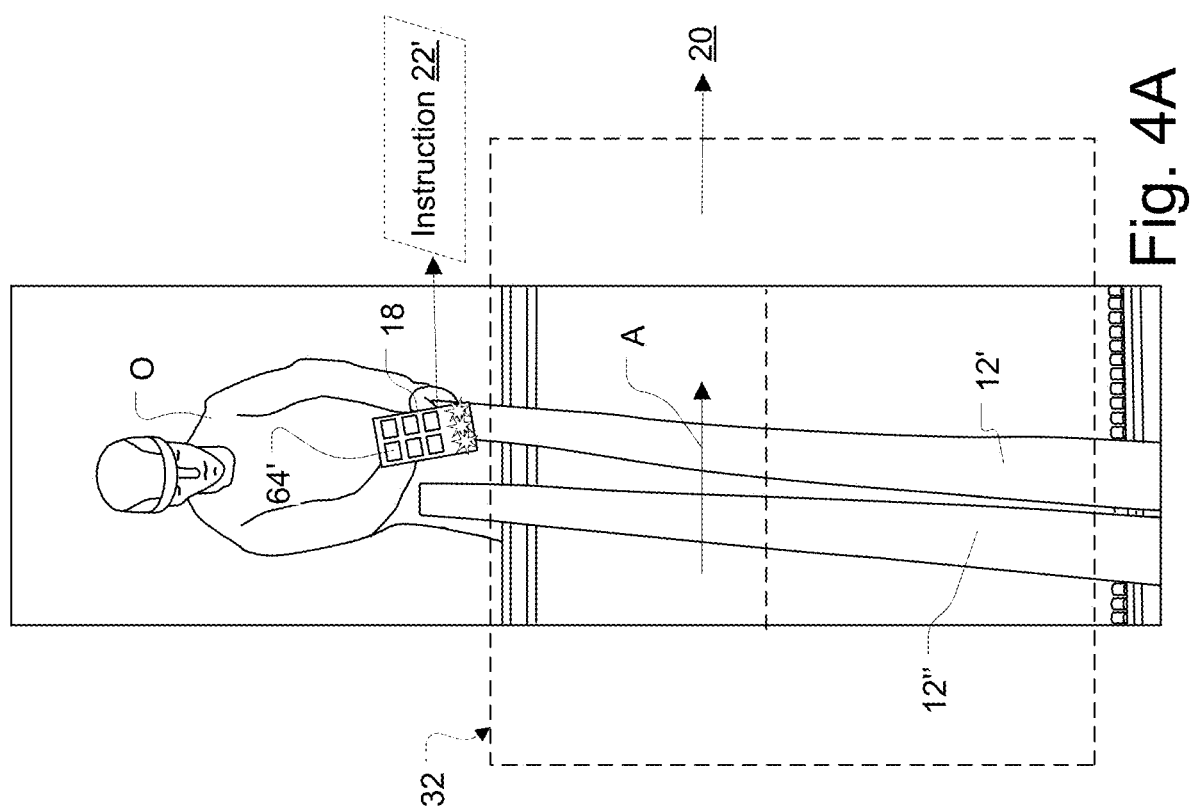
FIG. 4A is an oblique view of a portion of a handling area of a wood optimization system with an exemplary wood product selector in close proximity with a first wood product, in accordance with one or more embodiments.

As discussed above, the optimizer may be omitted in some embodiments. FIGS. 4A to 5B show an embodiment of such a wood optimization system. Referring now to FIG. 4A, first and second wood products 12' and 12' are being moved across a handling area 32 towards a trimmer 20. As the operator O appreciates the specificities of the first wood product 12', the operator O decides to assign a first instruction 22' to the first wood product 12'. To do so, the operator O brings the wood product selector 18 in close proximity to the first wood product 12', preferably in a manner where the wood product selector 18 overshadows a portion of the first wood product 12' as shown in the image 48' of FIG. 4B, and activates a first input source 64'. The first input source 64' may be a button which when pressed activates light indicators to illuminate in a first illumination pattern which is indicative of the first instruction 22'. In this specific embodiment, the first illumination pattern includes a series of three LEDs all illuminating at once. Upon recognizing the selected wood product, i.e., in this case the first wood product 12' as the wood product selector 18 is most proximate to that wood product 12' in the image 48, and the first illumination pattern which is indicative of the first instruction 22', the computer vision system can implement the first instruction 22' into optimization data associated to the first wood product 12' for later trimming and/or grading.

FIG. 5A illustrates that once a proper instruction has been implemented to a first one of the wood products, the operator may do the same for the second one of the wood products. In this case, the operator O decides to assign a second instruction 22" to the second wood product 22". To do so, the operator O brings the wood product selector 18 in close vicinity of the second wood product 12', preferably in a manner where the wood product selector 18 overshadows a portion of the second wood product 12" as shown in the image 48" of FIG. 5B, and activates a second input source 64". The second input source 64" may be another button which when pressed activates the light indicators to illuminate in a second illumination pattern which is indicative of the second instruction 22". In this specific embodiment, the second illumination pattern includes a series of two LEDs all illuminating at once. Upon recognizing the selected wood product, i.e., in this case the second wood product 12" as the wood product selector 18 is most proximate to that wood product, and the second illumination pattern which is indicative of the second instruction 22", the computer vision system can implement the second instruction 22" into optimization data associated to the second wood product 12" for later trimming and/or grading, and so forth until all the desired wood products are properly manually inspected.

Figure 6:
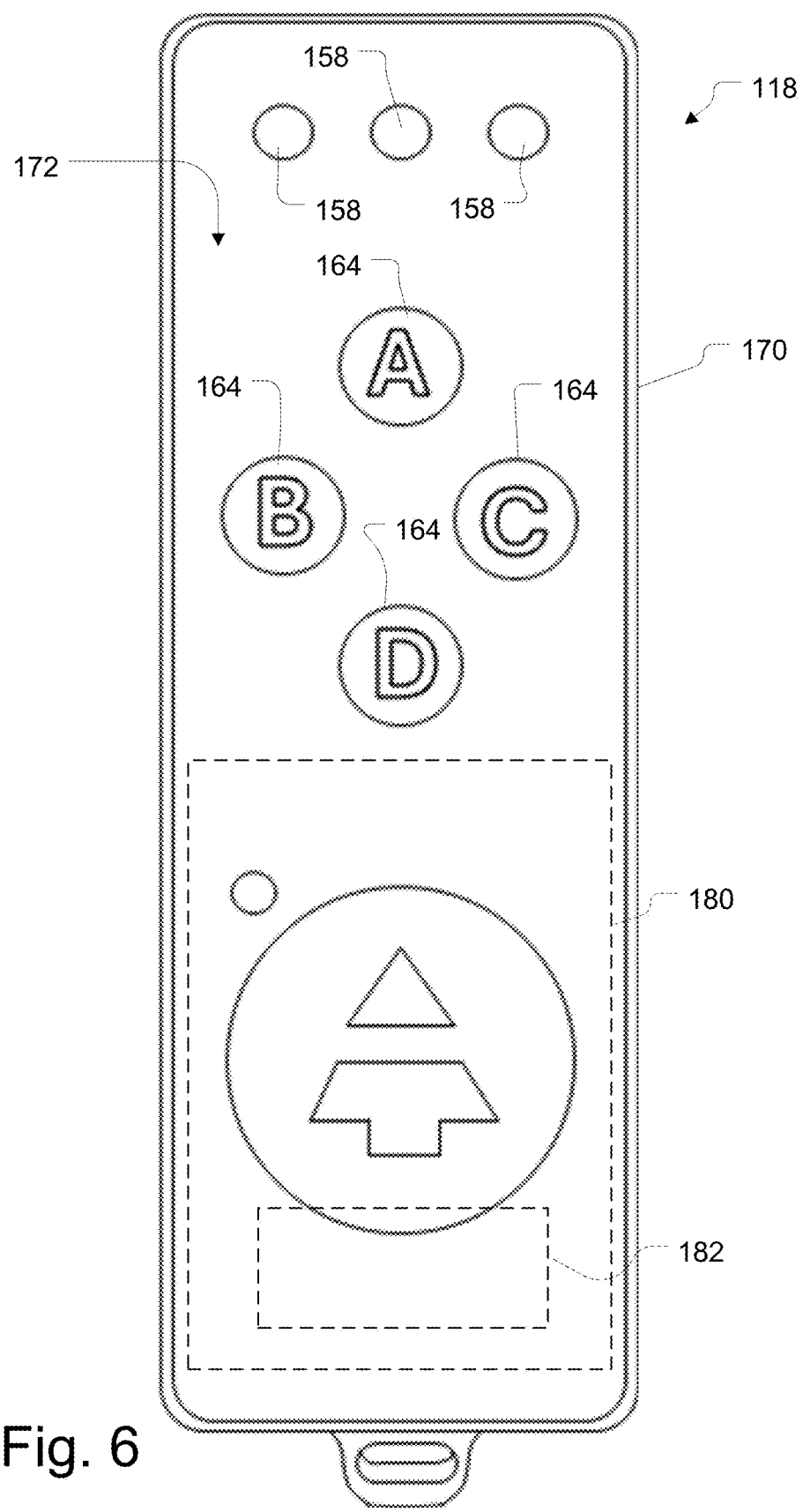
FIG. 6 is a top plan view of an example of a wood product selector, provided in the form of a controller, incorporating a computing device communicatively coupled to input sources, light indicators and a communication unit, in accordance with one or more embodiments.

FIG. 6 shows an example of a wood product selector 118 for use with a wood optimization system such as the one described with reference to FIG. 1. As depicted, the wood product selector 118 has a housing 170 having at least an exposed surface 172, input sources 164 mounted to the surface 172, and a computer 180 enclosed within the housing 170 and communicatively coupled to the input sources 164. The input sources 164 shown in this example are provided in the form of push buttons similar to those found in typical video game controllers. Upon activation of one of the input sources 164, the computer 180 generates in response a signal indicative of a desired instruction corresponding to the activated input source 164. As discussed above, the desired instruction is implementable into optimization data pertaining to a wood product being most proximate to the housing while the one of the input sources 164 is activated.

In some embodiments, the wood product selector 118 can have one or more light indicators 158. The light indicators 158 may be activated to indicate to the computer vision system that a signal indicative of a new instruction is being sent. As illumination patterns may be more easily recognizable by computer vision, generating such illumination patterns have been found to be useful. The illumination may be only momentarily in some embodiments. For instance, once an input source 164 is activated, the corresponding illumination pattern can be momentarily generated for a predetermined duration, e.g., 1 second, 2 seconds and the like. In some other embodiments, the light indicators 158 can be kept on until the computer vision system confirms that the new instruction has in fact been satisfactorily received, after which the light indicators 158 of the illumination pattern can be turned off. In some embodiments, the light indicators 158 are provided in the form of one or more light-emitting diode (LED) lights. However, any light bulbs or lighting elements may be used instead. The light indicators 158 can be activated in accordance to one or more illumination pattern to convey information. For instance, the illumination patterns may comprise the illumination patterns 001, 011, 101, and 111, to name a few examples, with, from left to right, 0 denoting a non-illuminating light indicator, 1 denotes an illumination light indicator. Different colours may be provided to provide enhanced coding capabilities. Although the depicted example shows that three light indicators 158, the number of light indicators can differ from one embodiment to another.

In some embodiments, the computer 180 of the wood product selector 118 can include a communication module 182. The communication module can be used to transmit the signal indicative of the new instruction in a wireless and/or wired manner to the computer vision system of the wood optimization system. The wireless communication protocol can differ from one embodiment to another. For instance, the communication protocol may be low-energy Bluetooth®, Wi-Fi, ZigBee and the like.

The computer 180 can be provided as a combination of hardware and software components. The hardware components can be implemented in the form of a computing device 700, an example of which is described with reference to FIG. 7.

Figure 7:
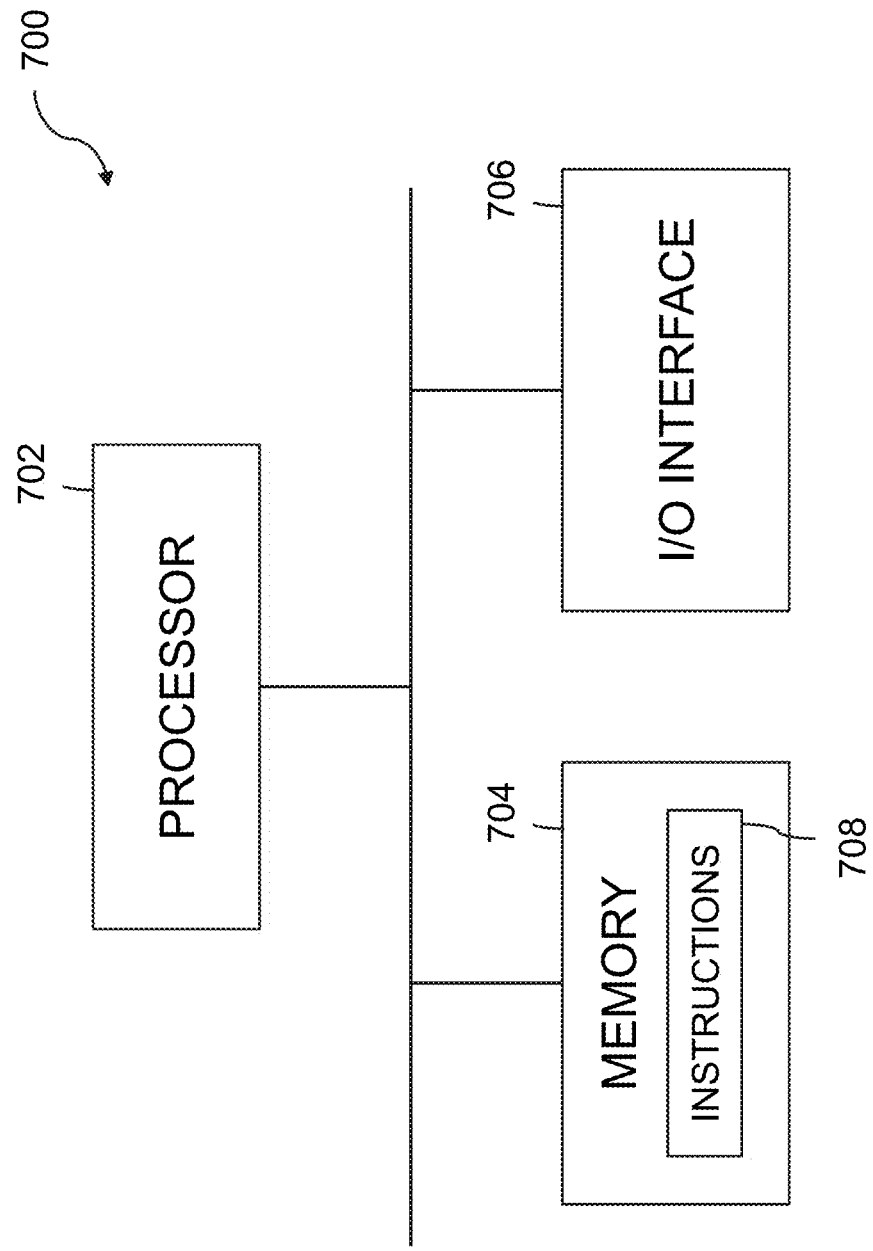
FIG. 7 is a schematic view of the computing device of FIG. 6, in accordance with one or more embodiments.

Referring to FIG. 7, the computing device 700 can have a processor 702, a memory 704, and I/O interface 706. Instructions 708 for generating the signal indicative of the desired instructions and/or for generating the illumination pattern(s) using the light indicators can be stored on the memory 704 and accessible by the processor 702.

The processor 702 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 704 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 706 enables the computing device 700 to interconnect with one or more input devices, such as the input source, or with one or more output devices such as the light indicators, communication units and the like.

Each I/O interface 706 enables the computing device 700 to communicate with other components, to exchange data with other components, to access and connect to network resources, to server applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The computing device 700 described above is meant to be examples only. Other suitable embodiments of the computing device 700 can also be provided, as it will be apparent to the skilled reader. The computer of the wood product selector can be a basic computer possess limited computing capabilities and requiring little amount of power. To that effect, typical battery(ies) or battery pack(s) may be used to power the wood product selector.

The following paragraphs describe other exemplary wood product selectors. FIGS. 8A to 8C show an embodiment where the wood product selector is provided in the form of a dedicated glove 218 worn by an operator's hand. In this embodiment, the step of finding the wood product selector in the image includes finding the dedicated glove 218 in the image. The step of identifying the selected wood product in the image includes identifying which of the imaged wood products is most proximate to the dedicated glove 218. The step of receiving a trimming and/or a grading instruction includes retrieving a hand sign formed by the dedicated glove 218 and associating that hand sign to a corresponding instruction using an instruction database, e.g., a trimming instruction database, a grading instruction database. The instruction database(s) may be accessible by the computer vision system to associate a number of hand signs to corresponding instructions. For instance, a first hand sign showing the index finger, such as shown in FIG. 8A, can be indicative of a first instruction, a second hand sign showing two fingers, such as shown in FIG. 8B, can be indicative of a second instruction, a third hand sign showing five fingers, such as shown in FIG. 8C, can be indicative of a third instruction, and so forth.

FIGS. 9A to 9C show an embodiment where the wood product selector is provided in the form of a multifaceted object 318 such as a playing die. In this embodiment, the step of finding the wood product selector in the image includes a step of finding the multifaceted object 318 in the image. The step of identifying the selected wood product in the image includes a step of identifying on which of the imaged wood products the multifaceted object 318 lies in the image. The step of receiving a trimming and/or grading instruction can include a step of includes a step of retrieving an indication exposed on an upwards facing facet of the multifaceted object 318 and associating that indication to a corresponding instruction using an instruction database. The instruction database(s) may be accessible by the computer vision system to associate a number of indications to corresponding instructions. For instance, an indication showing a first symbol, such as shown in FIG. 9A, can be indicative of a first instruction, an indication showing a second symbol, such as shown in FIG. 9B, can be indicative of a second instruction, an indication showing a third symbol, such as shown in FIG. 9C, can be indicative of a third instruction, and so forth.

FIGS. 10A to 10C show an embodiment where the wood product selector is provided in the form of a spot 418 of a laser pointer beam. In this embodiment, the step of finding the wood product selector in the image includes a step of finding the spot 418 of the laser pointer beam in the image. The step of identifying the selected wood product in the image includes a step of identifying which of the imaged wood products is illuminated by the spot 418 of the laser pointer beam. The step of receiving a trimming and/or grading instruction includes a step of retrieving a shape of the spot 418 of the laser pointer beam and associating that shape to a corresponding instruction using an instruction database. The instruction database(s) may be accessible by the computer vision system to associate a number of laser spot shapes, and declinations thereof, to corresponding instructions. For instance, a first laser spot shape, such as the circular spot shown in FIG. 10A, can be indicative of a first instruction, a second laser spot shape, such as the longitudinally extending laser line spot shown in FIG. 10B, can be indicative of a second instruction, a third laser spot shape, such as the transversally extending laser line spot shown in FIG. 10O, can be indicative of a third instruction, and so forth.

As can be understood, the examples described above and illustrated are intended to be exemplary only. In an embodiment, the trimmer can be provided in the form of an edger. Moreover, in another embodiment, the conveyor associated with the optimizer can be a transversal conveyor. In such an embodiment, the wood products may be tied to one another as they pass under the optimizer and then be freed from one another prior to arrival in the handling area. The wood product selector can be provided in the form of a mobile device such as a smart phone, an electronic tablet and the like, thereby linking said implementing to the mobile device or their operator. The mobile device can run an application in communication with the computer vision system and/or the wood optimization system. The screen of the mobile device displaying a given shape or symbol can serve as an illumination pattern being indicative of a corresponding trimming instruction. The scope is indicated by the appended claims.

What is claimed is:

1. A wood optimization system for a production line, the wood optimization system comprising:
   a conveyor configured for moving a plurality of wood products across a handling area;
   a wood product selector positionable to be proximate to a selected wood product of the plurality of wood products in the handling area; and
   a computer vision system along the production line having a camera imaging the handling area, a processor communicatively coupled to the camera, and a non-transitory computer-readable memory having stored thereon a computer program that, when executed by the processor, causes the computer vision system to perform the steps of:
   receiving from the camera an image representing at least a portion of the handling area;
   finding the wood product selector in the image;
   identifying the selected wood product in the image as the wood product of the plurality being most proximate to the wood product selector;
   receiving an instruction associated to the selected wood product; and
   implementing the instruction into optimization data associated to the selected wood product.

2. The wood optimization system of claim 1 wherein said instruction is a trimming instruction, the wood optimization system further comprising a wood product trimmer positioned downstream from the handling area in the production line and trimming the selected wood product in accordance with the optimization data implementing said trimming instruction.

3. The wood optimization system of claim 1 wherein said identifying the selected wood product in the image includes finding which one of the imaged wood products is at least partially overlapped with the wood product selector.

4. The wood optimization system of claim 1 wherein receiving the instruction includes finding a pattern formed by the wood product selector in the image, and associating the pattern to a corresponding instruction using an instruction database.

5. The wood optimization system of claim 4 wherein said pattern is an illumination pattern.

6. The wood optimization system of claim 1 wherein the wood product selector is a controller, wherein said finding the wood product selector in the image includes finding the controller in the image.

7. The wood optimization system of claim 6 wherein said identifying the selected wood product in the image includes identifying which of the imaged wood products of the plurality is most proximate to the controller.

8. The wood optimization system of claim 6 wherein the controller has a plurality of input sources and a communication unit communicatively coupled to the input sources and configured for wirelessly communicating a signal indicative of an instruction upon activation of a corresponding one of the input sources.

9. The wood optimization system of claim 8 wherein said receiving the instruction includes receiving said signal from said communication unit and associating said signal to a corresponding instruction using an instruction database.

10. The wood optimization system of claim 8 wherein said communication unit includes a radiofrequency antenna configured for generating the signal as a radiofrequency signal.

11. The wood optimization system of claim 8 wherein said communication unit includes one or more illumination sources configured for generating the signal as an illumination pattern, said receiving said signal from said communication unit includes retrieving the illumination pattern generated by the controller in the image.

12. A method of optimizing wood products in a production line, the method comprising:
   positioning a wood product selector proximate to a selected wood product of a plurality of wood products being handled across a handling area;
   using a camera, generating an image of the handling area representing at least the wood product selector and at least a proximate one of the wood products; and
   using a computer,
   finding the wood product selector in the image;
   identifying the selected wood product in the image as the wood product of the plurality being most proximate to the wood product selector;

receiving an instruction associated to the selected wood product; and implementing the instruction into optimization data associated to the selected wood product.

13. The method of claim 12 wherein said instruction is a trimming instruction, said method further comprising using a wood product trimmer, trimming the selected wood product in accordance with the optimization data implementing said trimming instruction.

14. The method of claim 13 wherein said identifying the selected wood product in the image includes finding which one of the imaged wood products is at least partially overlapped with the wood product selector.

15. The method of claim 14 wherein said finding is performed only in response to a determination by the computer that the image represents an illumination pattern formed by said wood product selector.

16. The method of claim 13 wherein receiving the instruction includes finding a pattern formed by the wood product selector in the image, and associating the pattern to a corresponding instruction using an instruction database.

17. The method of claim 16 wherein said pattern is an illumination pattern.

18. The method of claim 13 wherein said receiving an instruction associated to the selected wood product includes receiving an electromagnetic signal containing information, and associating said information to a corresponding instruction using an instruction database.

19. The wood product selector of claim 18 further comprising plurality of light indicators generating an illumination pattern being indicative of said desired instruction.

20. The wood product selector of claim 18 wherein said signal is wireless communicated to the wood optimization system.

21. The method of claim 13 wherein said receiving an instruction associated to the selected wood product includes identifying an illumination pattern generated by said wood product selector, and associating said illumination pattern to a corresponding instruction using an instruction database.

22. A wood product selector for use with a wood optimization system, the wood product selector comprising:

a housing having at least a surface;

a plurality of input sources mounted to said surface;

a computing device communicatively coupled to the input sources, the computing device configured to receive an input from an activated one of the input sources and, in response, generating a signal indicative of a desired instruction corresponding to the activated one of the input sources, said desired instruction being implementable into optimization data pertaining to a wood product most proximate to the housing while said activated one of the input sources is activated.

* * * * *